US007863903B2

(12) United States Patent
Koda et al.

(10) Patent No.: US 7,863,903 B2
(45) Date of Patent: Jan. 4, 2011

(54) COMBUSTION STATE DETECTION APPARATUS AND COMBUSTION STATE DETECTION METHOD FOR INTERNAL COMBUSTION ENGINE

(75) Inventors: Takeshi Koda, Kobe (JP); Takahiko Inada, Chiyoda-ku (JP); Kimihiko Tanaya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 374 days.

(21) Appl. No.: 12/102,351

(22) Filed: Apr. 14, 2008

(65) Prior Publication Data

US 2009/0108846 A1 Apr. 30, 2009

(30) Foreign Application Priority Data

Oct. 30, 2007 (JP) ............................ 2007-281790

(51) Int. Cl.
*F02P 17/02* (2006.01)
*G01L 23/22* (2006.01)

(52) U.S. Cl. ...................... 324/391; 324/399; 73/35.08; 123/594

(58) Field of Classification Search ................. 324/391, 324/399; 123/594; 73/35.08
See application file for complete search history.

(56) References Cited

U.S. PATENT DOCUMENTS 5,751,147 A * 5/1998 Nakata et al. ............... 324/399
6,281,682 B1 * 8/2001 Kameda et al. ............. 324/391
6,360,587 B1 * 3/2002 Noel ......................... 73/35.08
6,768,308 B2 * 7/2004 Hanazaki et al. ............ 324/378
6,813,933 B1 * 11/2004 Ketterer et al. ............. 73/35.08
6,865,929 B2 * 3/2005 Okamura et al. ......... 73/114.67
6,925,374 B2 * 8/2005 Matsushita et al. .......... 701/114
7,197,913 B2 * 4/2007 Zhu et al. .................. 73/35.08

FOREIGN PATENT DOCUMENTS

JP 11-013520 A 1/1999

* cited by examiner

*Primary Examiner*—Timothy J Dole
*Assistant Examiner*—John Zhu
(74) *Attorney, Agent, or Firm*—Sughrue Mion, PLLC

(57) ABSTRACT

A combustion state detection apparatus for an internal combustion engine, includes convexity detection means (30) for detecting that domain within the detection interval in which the change shape of the ionic current is upwardly convex, on the basis of the ionic current data extracted by data extraction means (20), and preignition decision means (40) including comparison setting means for setting a comparison value with which the upwardly convex domain is compared, and functioning to decide the occurrence of the preignition or the premonitory phenomenon thereof when the upwardly convex domain lies at a timing earlier than the comparison value, wherein the convexity detection means (30) includes leak current judgment means for judging the appearance of a leak current across electrodes, and it enables the detection of the upwardly convex domain when the appearance of the leak current has been judged.

13 Claims, 11 Drawing Sheets

COMBUSTION STATE DETECTION APPARATUS AND COMBUSTION STATE DETECTION METHOD FOR INTERNAL COMBUSTION ENGINE

BACKGROUND OF THE INVENTION

1. Field of the Invention

This invention relates to an internal combustion engine, and more particularly to a combustion state detection apparatus and a combustion state detection method for an internal combustion engine, wherein the occurrence of a preignition or the premonitory phenomenon thereof is detected on the basis of an ionic current involved in combustion.

2. Description of the Related Art

In an internal combustion engine of spark ignition type, a mixture sometimes self-fires earlier than a regular ignition timing, to incur preignition (earlier ignition). Since the durability of the internal combustion engine degrades due to the occurrence of the preignition, this preignition needs to be immediately suppressed at the occurrence thereof. Therefore, Patent Document 1 (Japanese Patent No. 3,552,142) has hitherto proposed a technique wherein the combustion state of the internal combustion engine is grasped from an ionic current flowing across the electrodes of an ignition plug, and the preignition is decided on the ground that the ionic current based on combustion appears before the fall of an ignition signal.

There has also been known a technique wherein the occurrence timing of that premonitory phenomenon (postignition) of the preignition which incurs self-firing immediately after ignition is measured on the basis of the ionic current flowing through the ignition plug.

However, there has been the problem that, in a case where "smoldering" (a phenomenon in which additives, etc. contained in fuel or lubricating oil carbonize to deposit carbon to the ignition plug) has occurred in the ignition plug, the preignition is erroneously detected. Therefore, a method wherein, in the case of the occurrence of the smoldering, the detection of the preignition is prohibited, and the same suppression control as at the occurrence of the preignition is performed, has been known from Patent Document 1.

The reason therefor is that, in the case of the occurrence of the smoldering in the ignition plug, the value of the insulation resistance between the ignition plug electrodes lowers, so a leak current flows in the same direction as that of the ionic current across the electrodes of the ignition plug before the fall of the ignition signal (in a primary current conduction period). The appearance period of the leak current tends to lengthen more as the degree of the smoldering becomes severer, and the appearance timing of the ionic current tends to become earlier as the strength of the preignition heightens more. The leak current and the ionic current based on the preignition overlap in some cases on account of such characteristics of both the currents. This poses the problem that the occurrence of the preignition cannot be decided simply in accordance with the existence or nonexistence of the ionic current.

Also in the premonitory phenomenon of the preignition, there is the problem that, in the case of the occurrence of the smoldering, the appearance position of the ionic current based on the combustion as is superposed on the leak current becomes difficult to be accurately grasped.

SUMMARY OF THE INVENTION

This invention has been made in order to solve the problems as mentioned above, and it has for its object to obtain a combustion state detection apparatus and a combustion state detection method for an internal combustion engine as can reliably detect the occurrence of preignition or the premonitory phenomenon thereof even in a case where smoldering has occurred.

A combustion state detection apparatus for an internal combustion engine according to this invention includes electrodes which are disposed within a combustion chamber of the internal combustion engine; voltage application means for applying a voltage across the electrodes in order to detect an ionic current which appears in a case where a mixture combusts within the combustion chamber; ionic current detection means for detecting the ionic current which appears across the electrodes at the application of the voltage; data extraction means including detection interval setting means for setting a detection interval for detecting preignition or a premonitory phenomenon thereof from the detected ionic current, the data extraction means serving to extract ionic current data correspondent to a change of the ionic current in the detection interval; convexity detection means for detecting that domain within the detection interval in which a change shape of the ionic current is upwardly convex, on the basis of the extracted ionic current data; and preignition decision means including comparison setting means for setting a comparison value to be compared with the upwardly convex domain, the preignition decision means serving to decide that the preignition or the premonitory phenomenon thereof has occurred, in a case where the upwardly convex domain lies at a timing earlier than the comparison value; wherein the convexity detection means includes leak current judgment means for judging existence or nonexistence of appearance of a leak current across the electrodes, and it enables the detection of the upwardly convex domain in a case where the appearance of the leak current has been judged.

In accordance with a combustion state detection apparatus and a combustion state detection method for an internal combustion engine according to this invention, preignition or the premonitory phenomenon thereof can be precisely detected even in a case where a leak current flows on account of the occurrence of smoldering.

The foregoing and other objects, features, aspects and advantages of this invention will become more apparent from the following detailed description of this invention when taken in conjunction with the accompanying drawings.

DESCRIPTION OF THE PREFERRED EMBODIMENTS

Embodiment 1

Figure 1:
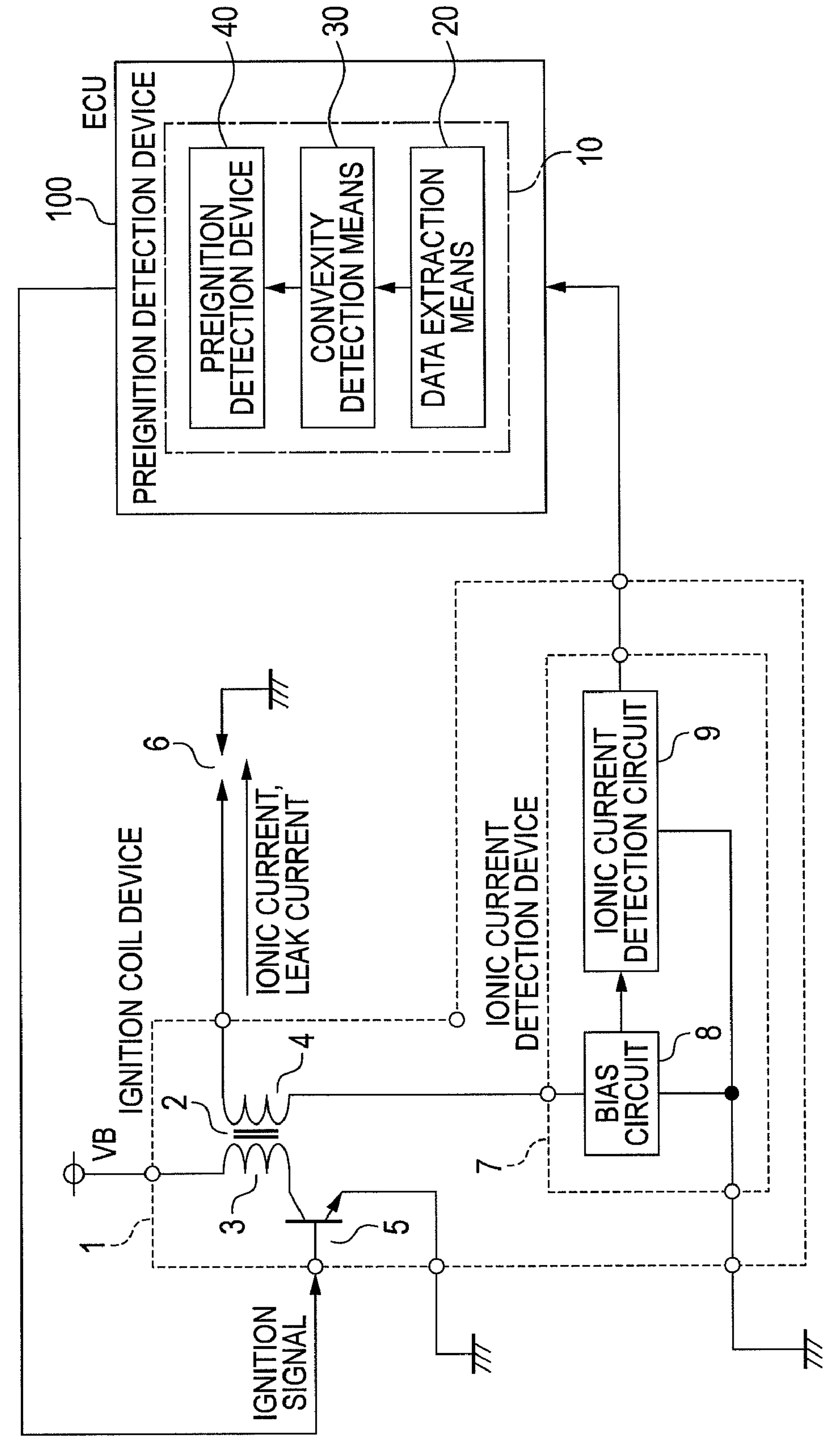
FIG. 1 is a schematic configurational diagram showing a combustion state detection apparatus for an internal combustion engine according to Embodiment 1 of this invention.

FIG. 1 is a schematic configurational diagram showing a combustion state detection apparatus for an internal combustion engine in Embodiment 1 of this invention.

Referring to FIG. 1, an ignition coil 2 has a primary coil 3 and a secondary coil 4 in an ignition coil device 1. One end of the primary coil 3 is connected to the DC supply voltage VB of a battery or the like, while the other end of the primary coil 3 is connected to a transistor 5 which is ON/OFF-controlled by an ignition signal from an ECU 100. One end of the secondary coil 4 is connected to an ignition plug 6, while the other end of the secondary coil 4 is connected to an ionic current detection device 7.

The ionic current detection device 7 is configured of a bias circuit 8 which is connected to the secondary coil 4, and an ionic current detection circuit 9 which is connected to the bias circuit 8 and which detects an ionic current.

In order to detect the ionic current by utilizing the secondary voltage of the ignition coil 2, the bias circuit 8 charges the ignition plug 6 being the detection probe of the ionic current, with a plus bias voltage.

In the above configuration, when the transistor 5 is turned ON by the ignition control signal from the ECU 100, a primary current flows through the primary coil 3 from the DC supply voltage VB. Thereafter, when the transistor 5 is turned OFF, the primary current of the primary coil 3 is cut off, and a minus high voltage is generated across the secondary coil 4 by electromagnetic induction, so that the ignition plug 6 is sparked.

On this occasion, the sparked ignition plug 6 has the plug bias voltage applied thereto by the bias circuit 8, and hence, the ionic current flows therethrough and is detected by the ionic current detection circuit 9. An ionic current signal outputted from the ionic current detection circuit 9 is inputted to the ECU 100 including the preignition detection device 10, in which preignition and the premonitory phenomenon thereof are detected.

As a basic configuration, the preignition detection device 10 includes data extraction means 20 for setting a detection interval for detecting the preignition or the premonitory phenomenon thereof from the ionic current signal detected by the ionic current detection device 7, and for extracting ionic current data correspondent to the change of the ionic current signal in the detection interval, convexity detection means 30 for detecting that domain within the detection interval in which the change shape of the ionic current is upwardly convex, on the basis of the ionic current data extracted by the data extraction means 20, and preignition decision means 40 for deciding the occurrence of the preignition or the premonitory phenomenon thereof in a case where the upwardly convex domain detected by the convexity detection means 30 is at a timing earlier than a predetermined comparison value.

Figure 2:
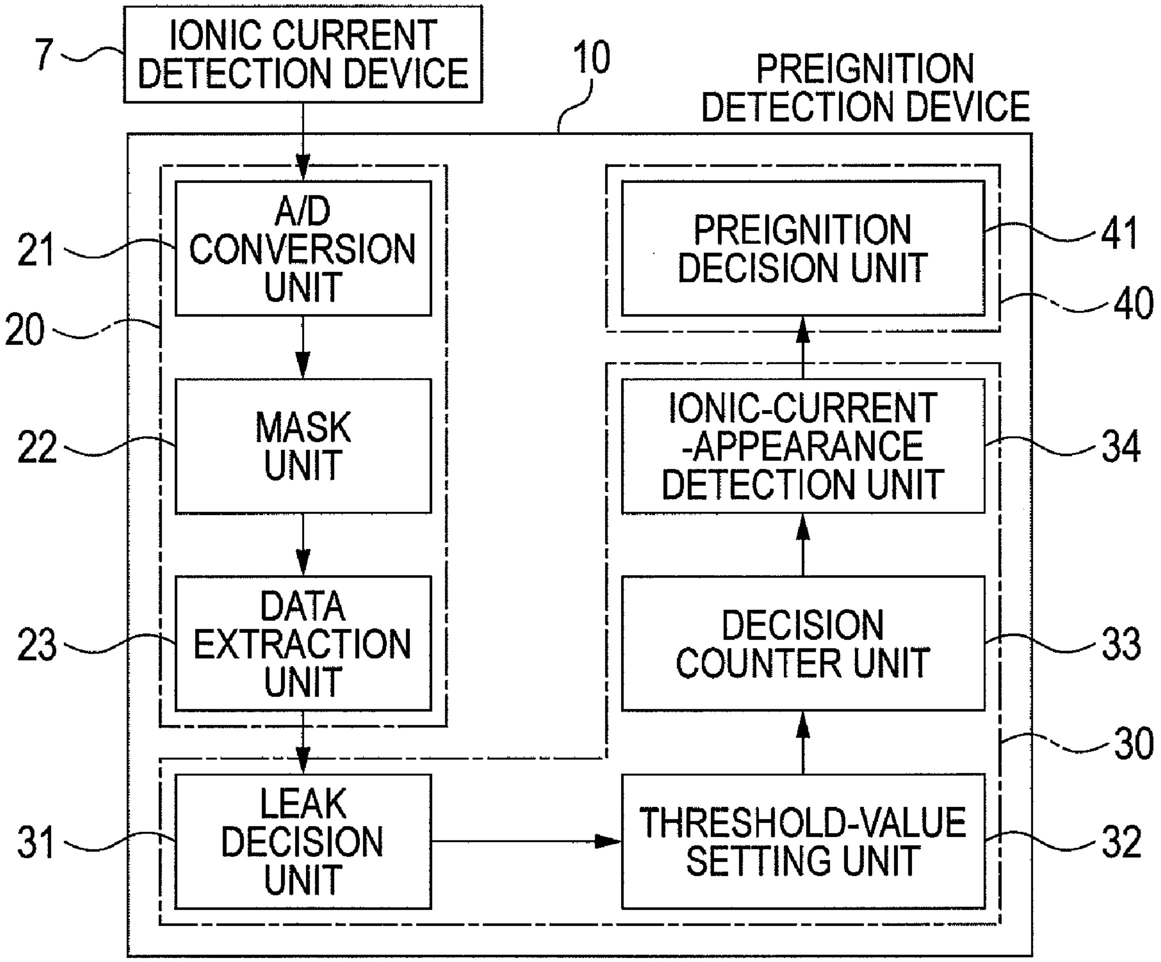
FIG. 2 is a block configurational diagram showing a preignition detection device in Embodiment 1 of this invention.

FIG. 2 shows a block configurational diagram of the preignition detection device 10 in FIG. 1.

First, in the data extraction means 20, the ionic current signal outputted from the ionic current detection device 7 is sent to an A/D conversion unit 21, and it is converted from analog data into digital data. In addition, noise generated at the bias voltage application is masked by a mask unit 22, and the resulting data is extracted as the ionic current data by a data extraction unit 23.

Subsequently, in the convexity detection means 30, when the appearance of a leak current has been judged by a leak decision unit 31, a bottom-hold (BH) decision threshold value is set by a threshold-value setting unit 32. Further, if the ionic current data has exceeded the ionic-current-appearance decision threshold value in succession a predetermined number of times or above, or in cumulation within a predetermined period a predetermined number of times or above, is decided by a decision counter unit 33 and an ionic-current-appearance detection unit 34.

The leak decision unit 31 is a unit which judges the appearance of the leak current in a case where, within a predetermined interval before the start of primary current conduction, the extracted ionic current data has exceeded a predetermined leak current decision threshold value continuously for, at least, a predetermined time period. Besides, the ionic-current-appearance decision threshold value is obtained by adding a predetermined offset to the BH decision threshold value.

Lastly, an ionic-current-appearance position is acquired on the basis of the decision result of the ionic-current-appearance detection unit 34 by a preignition decision unit 41 being the preignition decision means 40. Here, when the ionic-current-appearance position is before a predetermined value, the occurrence of the preignition is decided.

Figure 3:
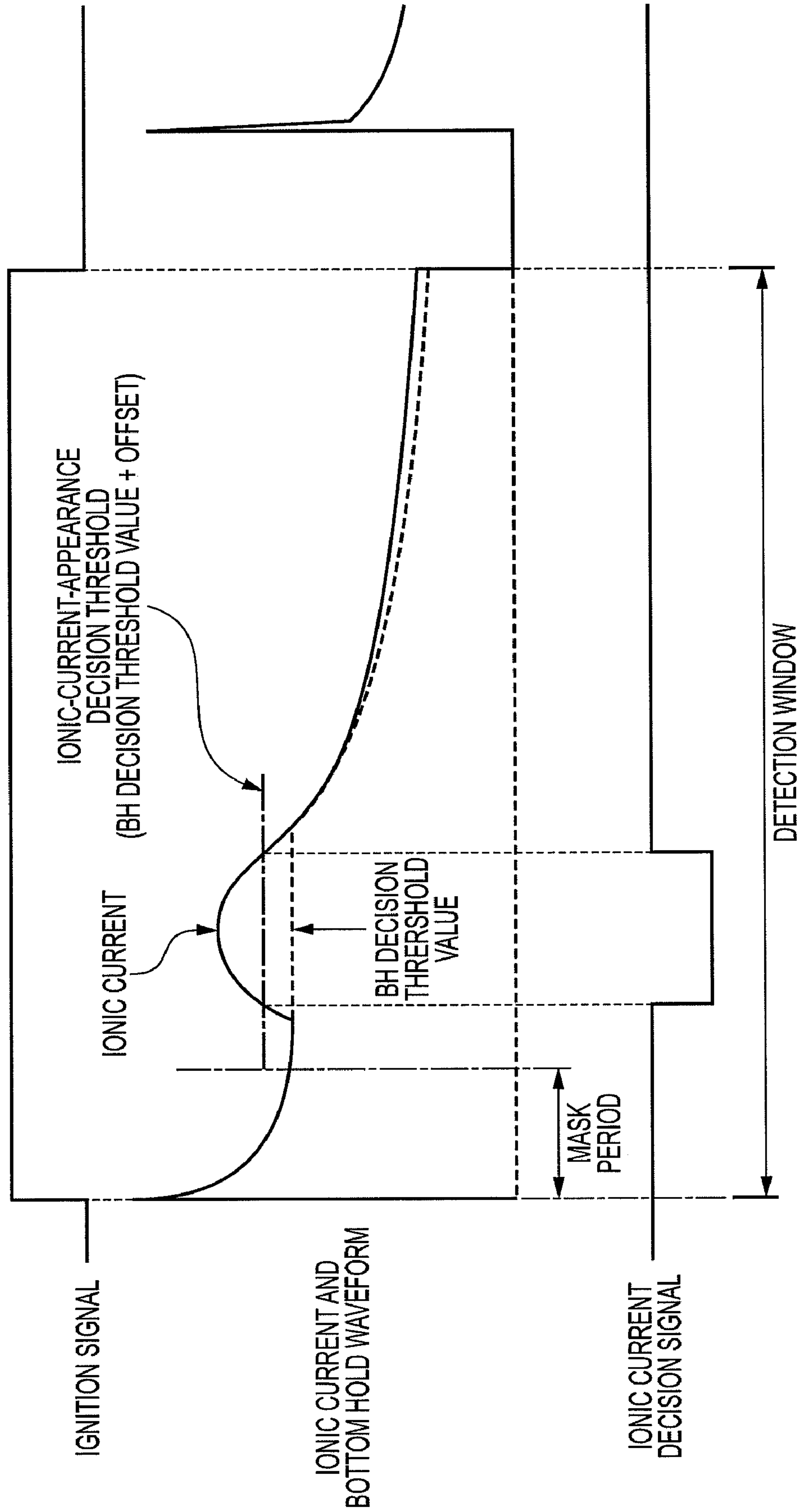
FIG. 3 is a timing chart showing the operation of the preignition detection device in Embodiment 1 of this invention.

Further, the internal operation of the preignition detection device 10 within the ECU 100 will be described with reference to a timing chart of FIG. 3 and a flow chart of FIG. 4. Incidentally, within FIG. 3, a section from the rise to the fall of an ignition signal is set as the detection window of preignition, and a method for processing data inside the detection window will be described.

Figure 4:
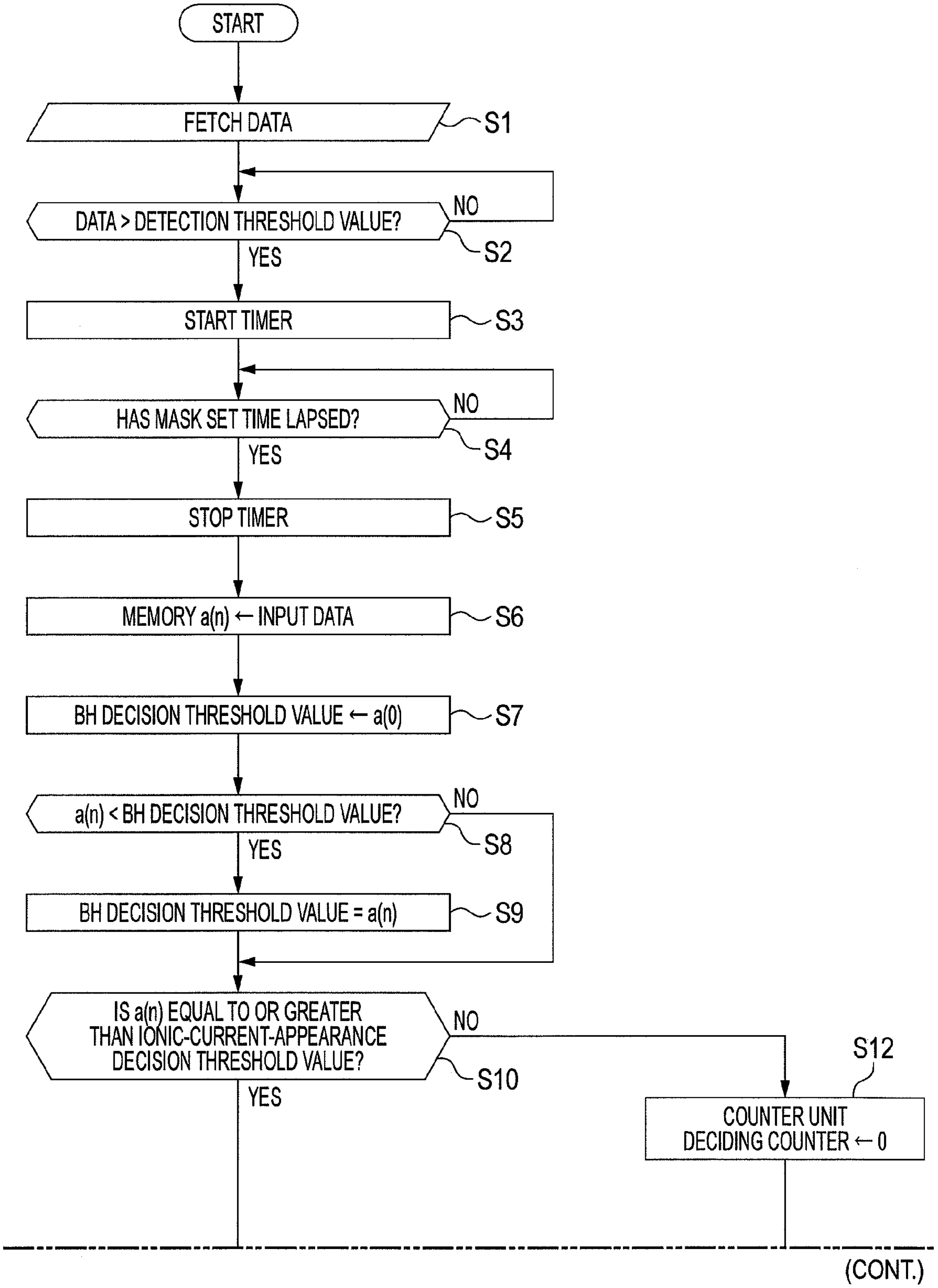
FIG. 4 is a processing flow chart of the preignition detection device in Embodiment 1 of this invention.
Figure 4:
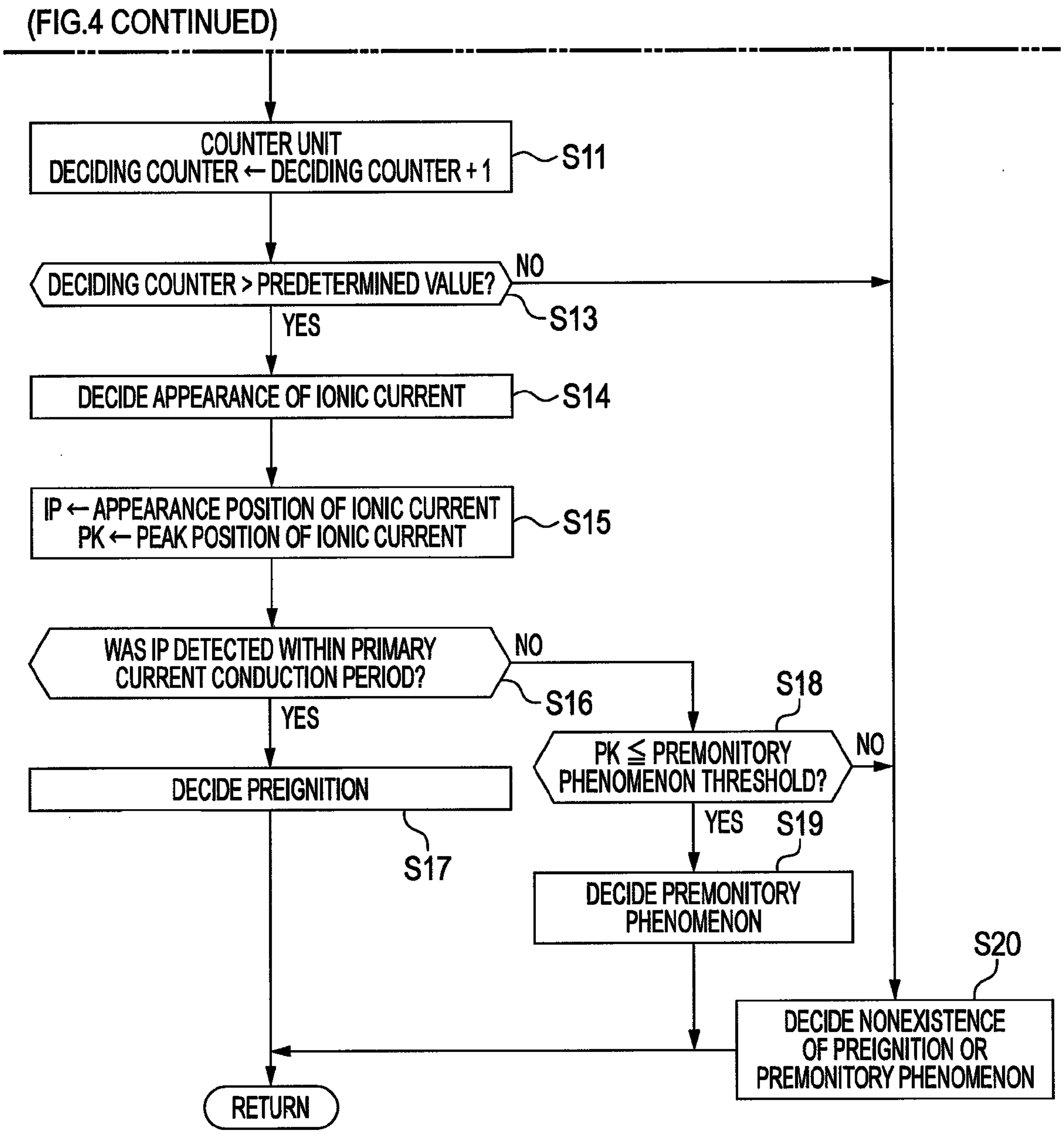

Ionic current data (an ionic current in FIG. 3) accepted into the preignition detection device 10 within the ECU 100 at a step S1 in FIG. 4 is compared with a detection threshold value at a step S2. When the ionic current data is greater than the detection threshold value, a timer is started at a step S3. When a mask set time period has lapsed at a step S4, the timer is stopped at a step S5, and the data accepted into the preignition detection device 10 are stored in a memory successively as a(1), a(2), . . . and a(n) at a step S6. The ionic current data accepted into the preignition detection device 10 before the lapse of the mask time period since the start of the timer undergoes the decision of "NO" at the step S4 and cannot proceed to the step S5. Therefore, the data is not stored in the memory and is neglected.

The steps S1-S6 correspond to the data extraction means 20.

Subsequently, at a step S7, the data a(0) is stored as the initial value of a BH decision threshold value. At a step S8, the threshold value is successively compared with the data a(1), a(2), . . . and a(n). If the result of the comparison is "YES", the routine proceeds to a step S9, whereby the BH decision threshold value is updated to a smaller value along the shape of the data. If the result of the comparison is "NO", the BH decision threshold value is not updated (is held), and the routine proceeds to a step S10 with the last value kept. Incidentally, the step S7 corresponds to start point setting means.

Here, in the case where the result of the comparison at the step S8 is "NO", the BH decision threshold value may well be attenuated at a predetermined attenuation rate without being held. In this way, the smaller change of the data can be grasped, and the detection precision of the preignition can be enhanced.

At the step S10, the data a(n) is compared with an ionic-current-appearance decision threshold value. When the data a(n) is equal to or greater than the decision threshold value, the routine proceeds to a step S11, at which the decision counter unit 33 is started. Besides, when the BH decision threshold value has been updated, a deciding counter is cleared at a step S12. In addition, when the value of the deciding counter has passed a predetermined value at a step S13, the occurrence of the preignition or combustion after ignition is judged by the ionic-current-appearance detection unit 34, so that the appearance of the ionic current is decided (Sl4).

The steps S7-S14 correspond to the convexity detection means 30.

Subject to the decision of the appearance of the ionic current, at a step S15, the ionic current data are integrated from the start point of the domain of the convex part of the ionic current, and a position at which the resulting integral value has exceeded a predetermined threshold value is determined as the appearance position IP of the ionic current. Also, a peak position PK in a period for which the appearance of the ionic current has been decided is found, and it is used for the decision of the preignition or the premonitory phenomenon thereof.

Incidentally, the appearance position IP of the ionic current can also be set at the start point of the domain where the change shape of the ionic current is upwardly convex.

At a step S16, if the appearance position IP of the ionic current was detected within the conduction period of the primary current is decided. In a case where the appearance position IP of the ionic current was detected within the conduction period of the primary current, the preignition is decided at a step S17. On the other hand, in a case where the appearance position IP of the ionic current was detected after the fall of ignition, the routine proceeds to a step S18. In the case where the appearance position IP was detected after the fall of the ignition, the decision of the premonitory phenomenon of the preignition or ordinary combustion is rendered.

Further, it is known that there is a correlation between the peak position PK of the ionic current and the peak position of the in-cylinder pressure of the internal combustion engine. In a case where the peak position of the in-cylinder pressure lies on an advanced angle side, a situation is such that a combustion rate is high, so the preignition is liable to occur. Therefore, when the peak position PK of the ionic current is detected earlier than a predetermined threshold value, the premonitory phenomenon of the preignition is decided at a step S19. The predetermined threshold value is acquired from a map based on the running conditions of the internal combustion engine.

By the way, in a case where "NO" has been judged at the step S13 or S18, it is decided at a step S20 that the preignition or the premonitory phenomenon thereof is not existent.

The steps S15-S20 correspond to the preignition decision means 40.

As described above, a combustion state detection apparatus for an internal combustion engine according to Embodiment 1 includes ionic current detection means 7 for detecting an ionic current across the electrodes of an ignition plug as appears in a case where a mixture combusts within the combustion chamber of the internal combustion engine, data extraction means 20 including detection interval setting means for setting a detection interval for detecting preignition or the premonitory phenomenon thereof from the ionic current detected by the ionic current detection means 7, the data extraction means 20 functioning to extract ionic current data correspondent to the change of the ionic current in the detection interval set by the detection interval setting means, convexity detection means 30 for detecting that domain within the detection interval in which the change shape of the ionic current is upwardly convex, on the basis of the ionic current data extracted by the data extraction means 20, and preignition decision means 40 including comparison setting means for setting a comparison value to be compared with the upwardly convex domain, the preignition decision means 40 functioning to decide the occurrence of the preignition or the premonitory phenomenon thereof in a case where the upwardly convex domain lies at a timing earlier than the comparison value, wherein the convexity detection means 30 includes leak current judgment means for judging the existence or nonexistence of the occurrence of a leak current across the ignition plug electrodes, and it enables the detection of the upwardly convex domain in a case where the occurrence of the leak current has been judged.

In accordance with Embodiment 1, accordingly, the preignition can be reliably detected even in the case where the leak current has appeared across the electrodes of the ignition plug.

Embodiment 2

In Embodiment 1, in the case of the leak current appearance, the appearance position of the ionic current involved in the combustion has been grasped by comparing the BH decision threshold value and the ionic current data. In Embodiment 2, the appearance position is grasped from the change magnitudes of the ionic current data, and this method will now be described.

First, in Embodiment 2, the ionic current data of each predetermined interval shall be used for the calculation of a derivative function in order to avoid or moderate the influence of noise, etc. for the acquired ionic current data.

Figure 5:
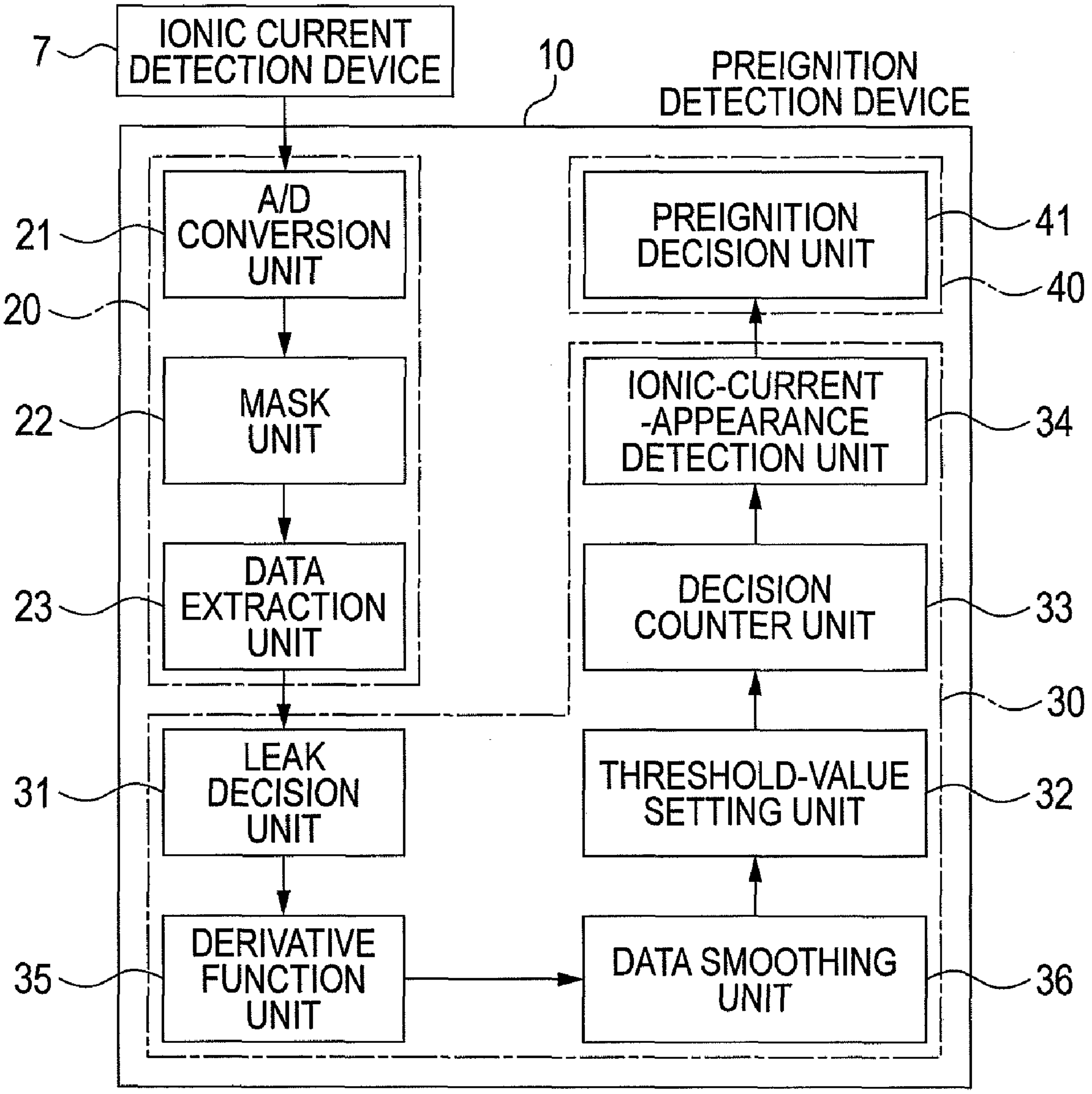
FIG. 5 is a block configurational diagram showing a preignition detection device in Embodiment 2 of this invention.

FIG. 5 shows a configurational diagram of a preignition detection device 10 for an internal combustion engine according to Embodiment 2. The course till the decision of the existence or nonexistence of a leak current by a leak decision unit 31 is the same as in Embodiment 1.

When the appearance of the leak current has been judged by the leak decision unit 31, the change magnitudes of individual data are computed by a derivative function unit 35, so as to obtain a linear derivative. Subsequently, the average value c(n) of those change magnitudes b(n) of several successive data which have been computed by the derivative function unit 35 is computed by a data smoothing unit 36. The data c(n) indicates the tendency of the gradient of the ionic current. A peak hold (PH) threshold value is set for the tendency c(n) of the change of the data by a threshold-value setting unit 32. Further, if the tendency c(n) of the change of the data has become lower than the PH threshold value in succession a predetermined number of times or above, or in cumulation within a predetermined period a predetermined number of times or above, is judged by a decision counter unit 33 and an ionic-current-appearance detection unit 34. In a preignition decision unit 41, the appearance position IP of the ionic current is acquired on the basis of the result of the decision of the ionic-current-appearance detection unit 34, and preignition is decided when the ionic-current appearance position IP is before a predetermined value.

Next, the internal operation of the preignition detection device 10 of the above configuration will be described with reference to a timing chart of FIG. 6 and a flow chart of FIG. 7.

Figure 6:
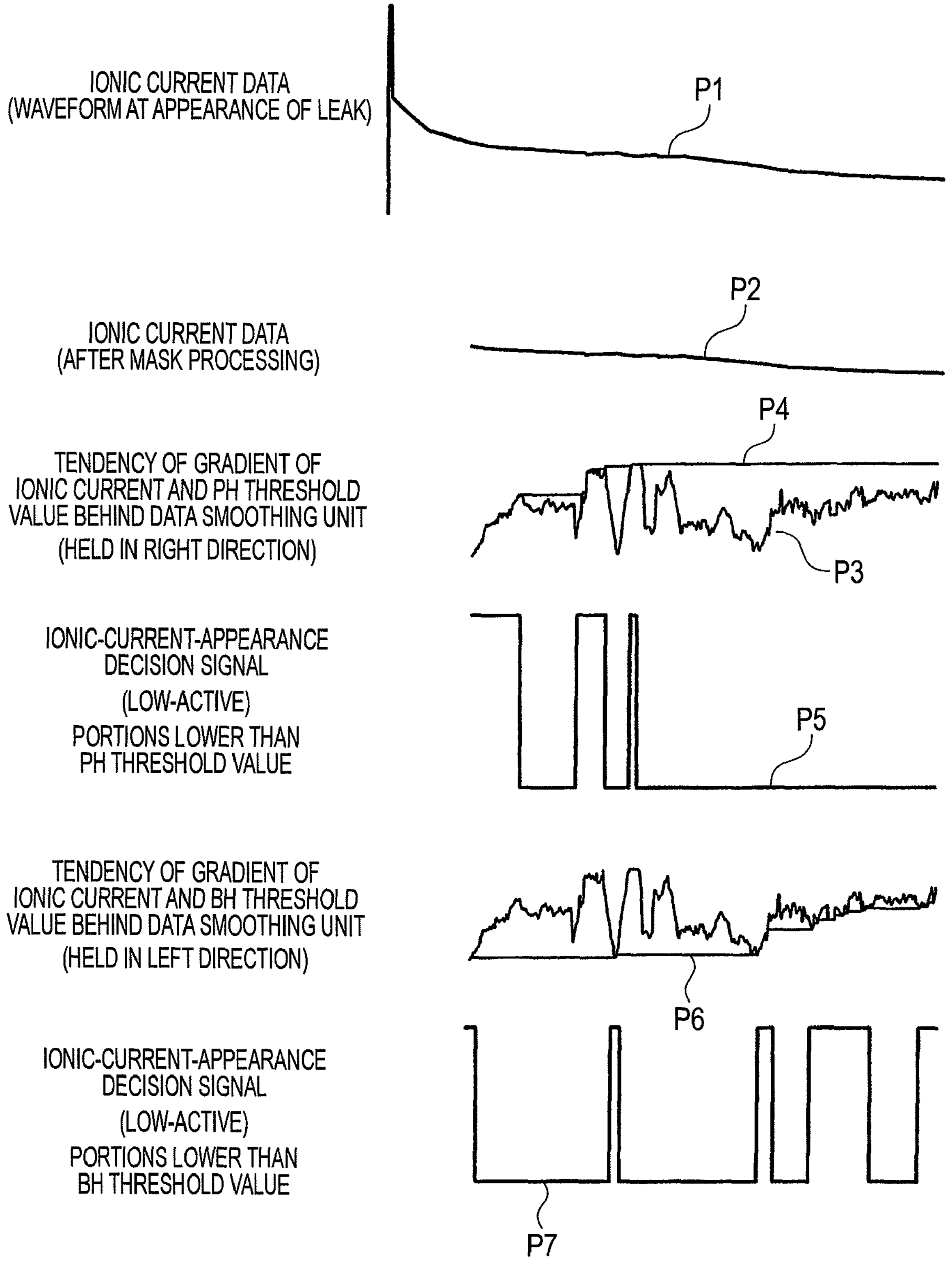
FIG. 6 is a timing chart showing the operation of the preignition detection device in Embodiment 2 of this invention.
Figure 7:
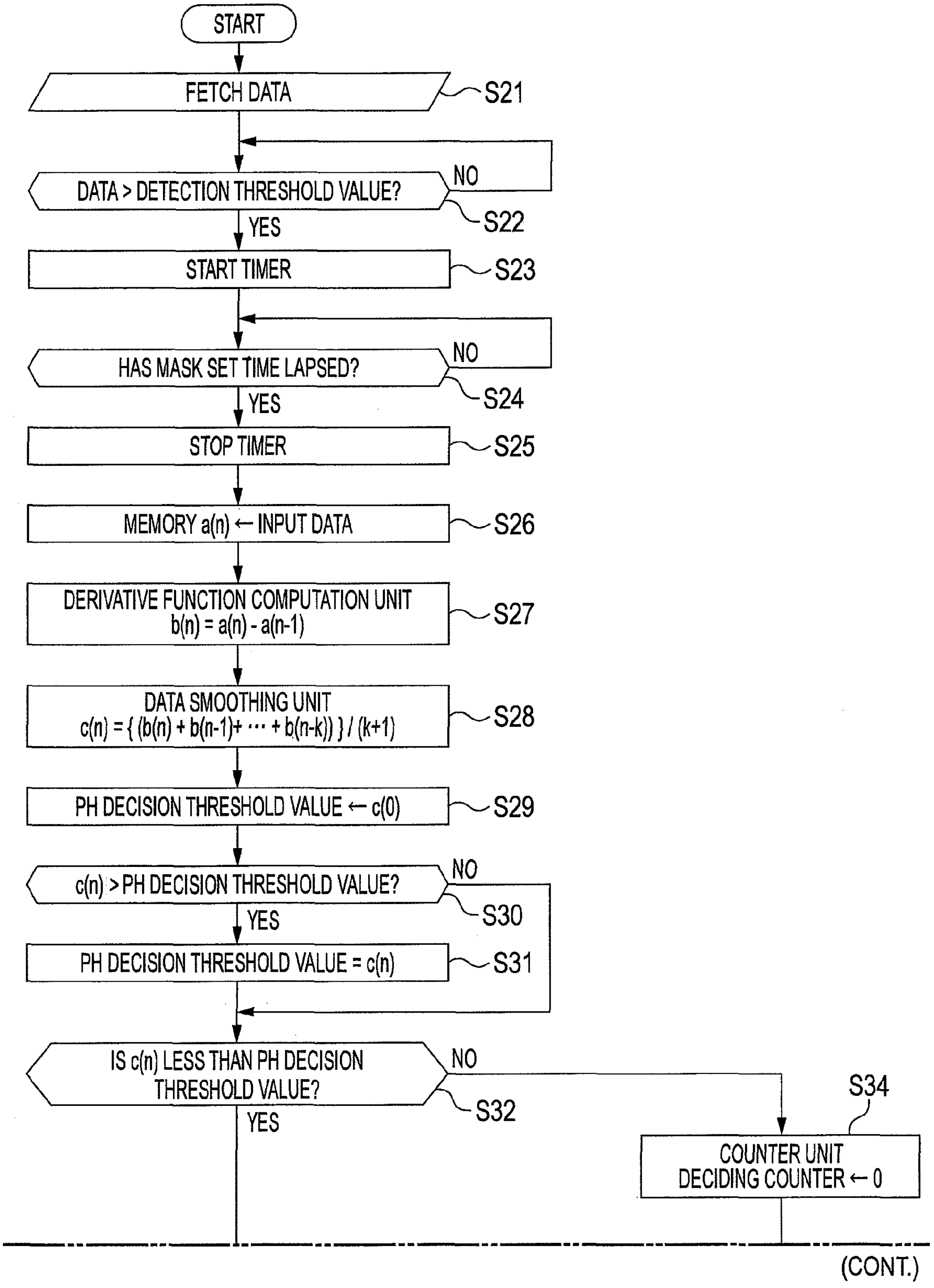
FIG. 7 is a processing flow chart of the preignition detection device in Embodiment 2 of this invention.
Figure 7:
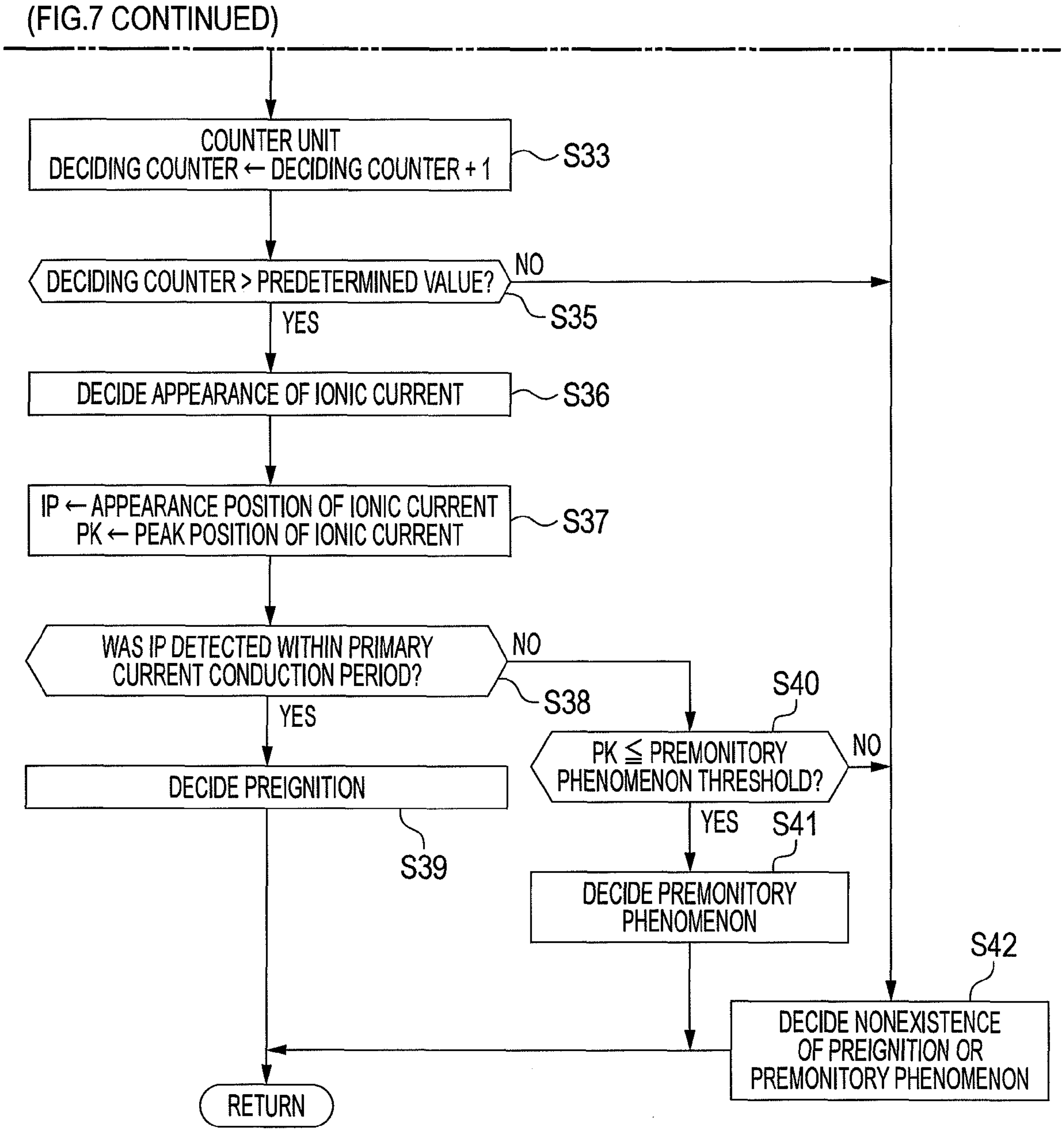

Ionic current data (FIG. 6: P1) accepted into the preignition detection device 10 within an ECU 100 at a step S21 in FIG. 7 is compared with a detection threshold value at a step S22. When the ionic current data is greater than the detection threshold value, a timer is started at a step S23. When a mask set time period has lapsed at a step S24, the timer is stopped at a step S25, and the ionic current data accepted into the preignition detection device 10 are stored in a memory successively as a(1), a(2), . . . and a(n) at a step S26 (FIG. 6: P2). The data accepted into the preignition detection device 10 before the lapse of the mask time period since the start of the timer undergoes the decision of "NO" at the step S24 and cannot proceed to the step S25. Therefore, the data is not stored in the memory and is neglected.

The steps S21-S26 correspond to data extraction means 20.

The array data a(n) stored in the memory at the step S26 are subjected to the computation of Formula (1) by the derivative function unit 35 at a step S27, and the computed data are stored as the array data b(n):

$$b(n)=a(n)-a(n-1) \tag{1}$$

The array data b(n) obtained on this occasion correspond to the linear derivative, and indicate the gradient of the ionic current. Further, the routine proceeds to a step S28, at which the array data b(n) are subjected to the computation of Formula (2) by the data smoothing unit 36, and smoothed results are stored as the array data c(n):

$$c(n)=\{(b(n)+b(n-1)+ \ldots +b(n-k))\}/(k+1) \tag{2}$$

The array data c(n) obtained on this occasion is the smoothed linear derivative, and indicate the tendency of the gradient of the ionic current (FIG. 6: P3).

Besides, at a step S29, c(0) is stored as the initial value of the PH decision threshold value. At a step S30, the threshold value is successively compared with the array data c(1), c(2), . . . and c(n) stored at the step S28, whereupon the larger value is always updated as the PH decision threshold value at a step S31 (FIG. 6: P4).

When the array data c(n) is less in comparison with the PH decision threshold value at a step S32, the routine proceeds to a step S33, at which the decision counter unit 33 is started. When the value of the PH decision threshold value has been rewritten, the routine proceeds to a step S34, at which the deciding counter is cleared to "0". When the value of the deciding counter has passed a predetermined value at a step S35, the occurrence of the preignition or the combustion after the ignition is judged by the ionic-current-appearance detection unit 34, and the appearance of the ionic current is decided (step S36) (FIG. 6: P5).

The steps S27-S36 correspond to the convexity detection means 30.

Subject to the decision of the appearance of the ionic current, the array data c(n) into which the linear derivative has been smoothed are integrated from the start point of the domain of the convex part of the ionic current by the preignition decision unit 41, and a position at which the resulting integral value has exceeded a predetermined threshold value is determined as the appearance position IP of the ionic current, while a peak position PK in a period for which the appearance of the ionic current has been decided is found (step S37) and is used for the decision of the preignition or the premonitory phenomenon thereof. At a step S38, if the appearance position IP of the ionic current was detected within the conduction period of a primary current is decided. In a case where the appearance position IP of the ionic current was detected within the conduction period of the primary current, the preignition is decided (step S39). On the other hand, in a case where the appearance position IP of the ionic current was detected after the fall of the ignition, the routine proceeds to a step S40. In the case where the appearance position IP was detected after the fall of the ignition, the premonitory phenomenon of the preignition and ordinary combustion must be discriminated. For this purpose, when the peak position PK of the ionic current is detected at or earlier than a predetermined threshold value, the premonitory phenomenon of the preignition is decided (step S41). The predetermined threshold value is acquired from a map based on the running conditions of the internal combustion engine.

By the way, in a case where "NO" has been judged at the step S35 or S40, it is decided at a step S42 that the preignition or the premonitory phenomenon thereof is not existent.

The steps S37-S42 correspond to the preignition decision means 40.

In the embodiment, the peak-hold threshold values have been successively set for the tendencies of the data changes in the order of the accepted data. However, BH threshold values may well be set from the end position of the data acceptance toward the start position thereof by tracing back time (FIG. 6: P6).

An output on this occasion becomes as shown at P7 in FIG. 6. Therefore, even in the case where the leak current has appeared, only the ionic current which appears with the preignition or the premonitory phenomenon thereof can be detected, so that a detection precision can be enhanced.

In accordance with Embodiment 2, accordingly, the preignition can be detected more precisely even in the case where the leak current has appeared across the electrodes of the ignition plug.

By the way, in Embodiment 2, the decision of the preignition or the premonitory phenomenon thereof has been rendered by employing the linear derivative, but a quadratic derivative may well be obtained in such a way that, after the signal processing by the derivative function unit 35 and the smoothing unit 36, computations are executed by a derivative function unit and a smoothing unit once more.

Values c(n) obtained by smoothing the quadratic derivative indicate the tendency of the concave and convex changes of the ionic current, and a domain where the quadratic derivative values c(n) become minus is led out, whereby only the fluctuation of the ionic current involved in the preignition or the premonitory phenomenon thereof can be extracted without being influenced by a fluctuation attendant upon minute noise or data discretion.

Besides, the strength of the preignition or the premonitory phenomenon thereof can be obtained by calculating the area value of the ionic current within the predetermined period of the ionic current which is based on the preignition or the premonitory phenomenon thereof detected by the ionic-current-appearance detection unit 34 of Embodiment 1 or 2. The reason therefor is that the area value of the preignition or the premonitory phenomenon thereof becomes larger as the strength becomes higher. In this way, the detection strength of the preignition or the premonitory phenomenon thereof can be precisely obtained.

Further, in Embodiment 1 or 2, in the case where the leak current has appeared, the suppression control of the preignition may well be performed without regard to the detection result of the preignition or the premonitory phenomenon thereof. It has been known that the preignition occurs by the cause of soot which has adhered to a locally overheated place, for example, around the firing part of the ignition plug 6 or within the combustion chamber. Since the leak current appears in case of the adhesion of the soot to the ignition plug 6, the appearance of the leak current indicates a state where the preignition is liable to occur. In the case of the appearance of the leak current, therefore, the occurrence of the preignition can be suppressed beforehand by performing the preignition suppression control.

Embodiment 3

In Embodiment 1 or 2, the detection of the preignition or the premonitory phenomenon thereof has been performed by disposing the single ignition plug 6 in one combustion chamber. However, the detection of the preignition or the premonitory phenomenon thereof may well be performed by disposing a plurality of ignition plugs in one combustion chamber.

The ionic current detection device 7 accumulates charges for detecting the ionic current, during an ignition spark, and it thereafter detects the ionic current involved in combustion. Therefore, the ionic current detection device 7 is incapable of detecting the ionic current during the spark ignition. The preignition or the premonitory phenomenon thereof is sometimes such that, since the combustion rate of a mixture is high, most of the ionic current appears during the ignition spark as shown in FIG. 6. For this reason, the single-point ignition system becomes difficult of detecting an accurate combustion state. Therefore, the detection may well be performed by disposing the plurality of ignition plugs in one combustion chamber.

Here will be described a case where two ignition plugs are disposed in one combustion chamber. However, the invention is not restricted only to the case of the two ignition plugs, but it may well be applied to an internal combustion engine which includes three or more ignition plugs in one combustion chamber.

Figure 8:
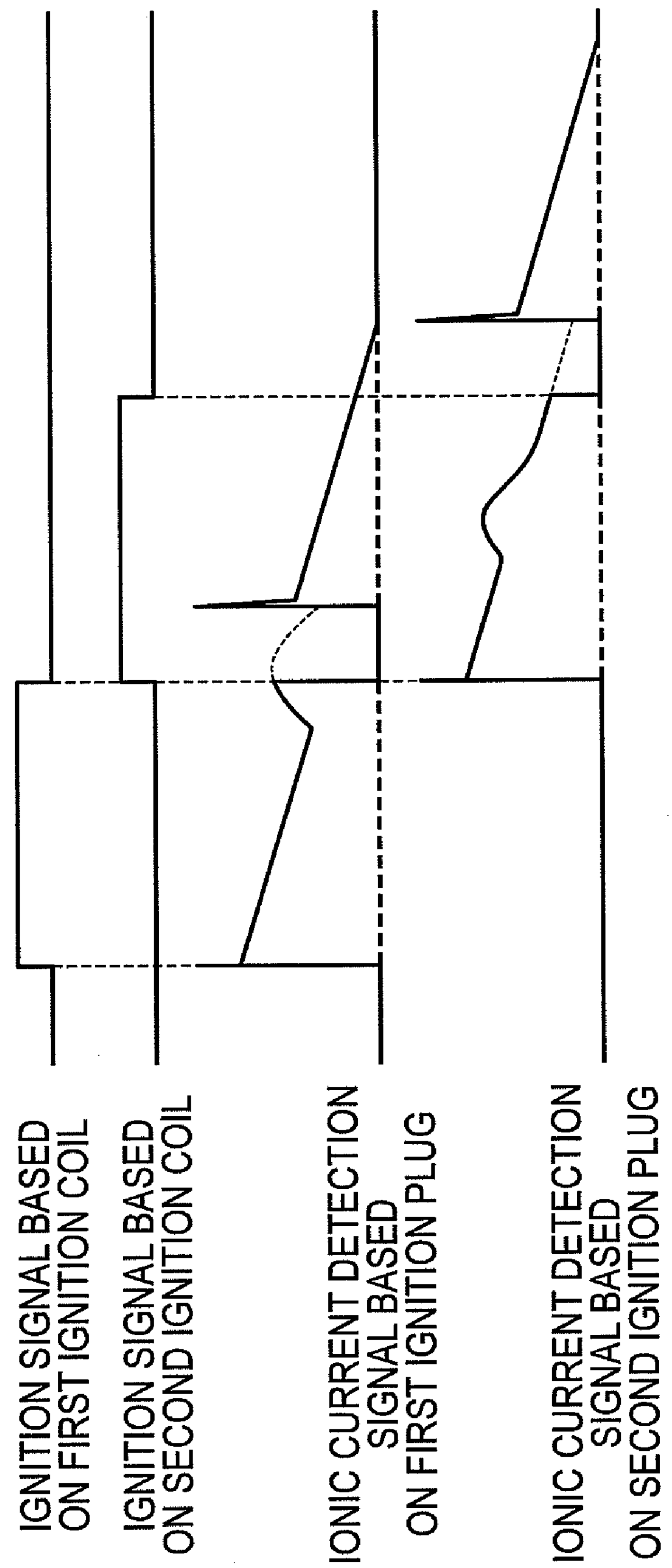
FIG. 8 is a waveform diagram for explaining the operation of a preignition detection device in Embodiment 3 of this invention.

Concretely, a technique to be stated below is adopted. When the ignition timing of a second ignition coil is retarded relative to that of a first ignition coil, a flame propagation time period based on the firings of the ignition plugs can be reliably measured by the ignition plugs. By way of example, the conduction start timing of a primary coil in the second ignition coil is set at the spark start timing (ignition timing) of the first ignition coil as shown in FIG. 8. In the first ignition coil, the lack of ionic current information involved in preignition as is superposed on a leak current takes place in some cases. However, when the ignition timing of the second ignition coil is retarded relative to that of the first ignition coil as in the above technique, a flame propagation rate can be measured on the basis of the appearance position of a combustion ionic current in the second ignition coil. Besides, a larger number of ionic current information items can be acquired by retarding the conduction start timing of the primary coil of the second ignition coil still further.

In accordance with Embodiment 3, the ionic current information items in the case of the occurrence of the preignition or the premonitory phenomenon thereof can be acquired in the larger number, and the preignition or the premonitory phenomenon thereof can be precisely detected and its detection precision is therefore enhanced.

Embodiment 4

In each of Embodiments 1-3, the ionic current detection signals of individual combustion chambers have been respectively inputted to the ECU 100, but these ionic current detection signals of the individual combustion chambers may well be collected into one signal by taking the sum thereof so as to input the sum signal to the ECU 100.

Figure 9:
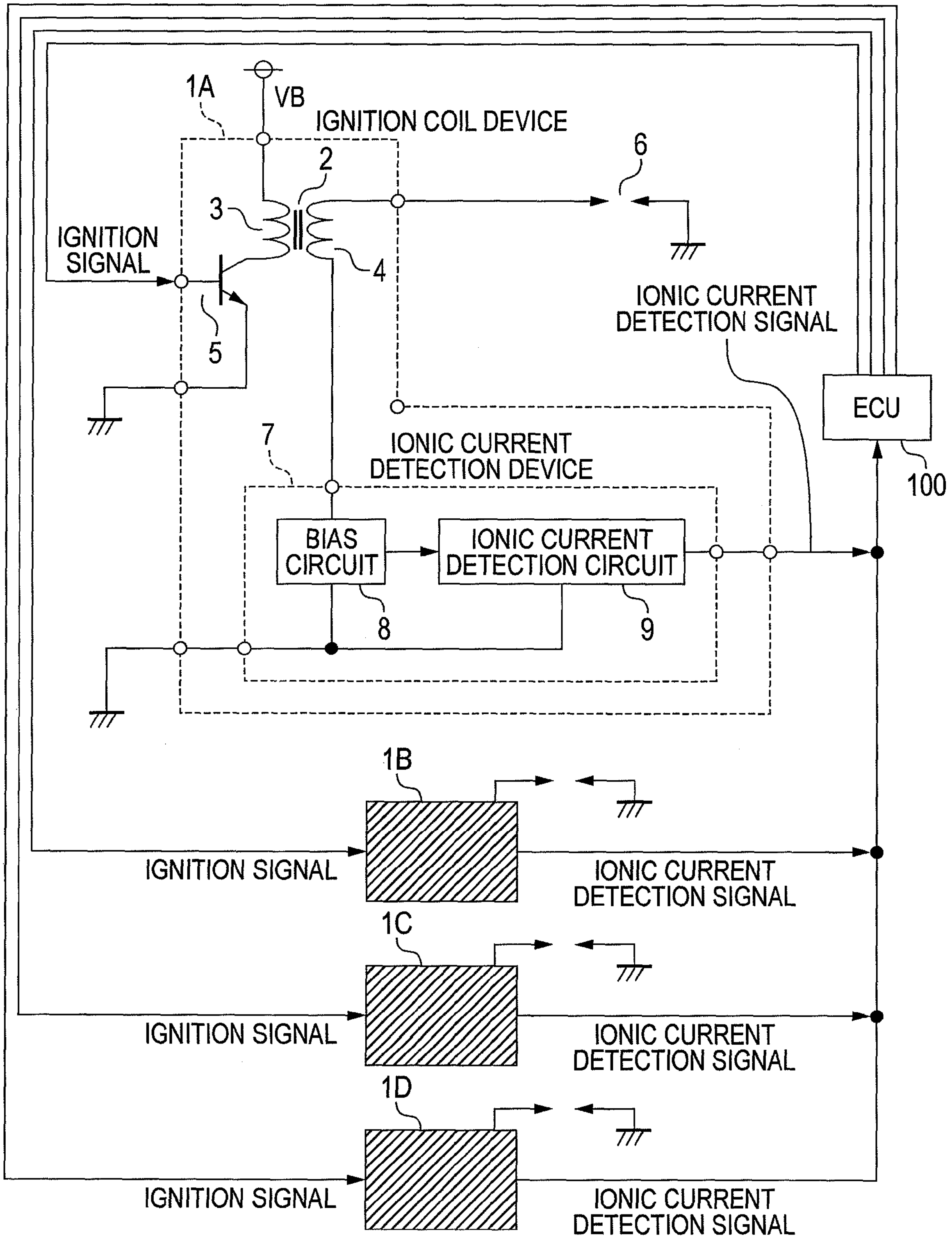
FIG. 9 is a schematic configurational diagram of a combustion state detection apparatus for an internal combustion engine according to Embodiment 4 of this invention.

FIG. 9 shows a schematic configurational diagram of Embodiment 4. Here, an internal combustion engine of four cylinders will be described. In the foregoing configuration, the ionic current detection signals detected in the four combustion chambers have been respectively inputted to the ECU 100, and hence, the input interfaces of the ECU 100 have been necessary in the number of four. However, in a case where the same ignition coil devices 1A-1D are disposed in correspondence with the respective combustion chambers as shown in FIG. 9, and where the ionic current detection signals of the respective combustion chambers are collected into one signal by taking the sum thereof so as to input the sum signal to the ECU 100, only one line suffices for the ionic current detection signal which is inputted to the ECU 100, and a circuit scale can be made small. This is greatly meritorious especially in an internal combustion engine having a large number of cylinders such as six cylinders and eight cylinders. Besides, the sum of the ionic current detection signals may well be taken in the combination of cylinders which are spaced at intervals of one cylinder in an ignition sequence.

In the prior art, in a case where smoldering has occurred in one cylinder, all the cylinders are influenced by the smoldering when the sum of the ionic current detection signals is taken. With the prior-art detection technique, therefore, the detection of preignition is erroneously detected. In contrast, even in the case where the smoldering has occurred, the preignition can be precisely detected by applying Embodiment 1 or 2.

In the internal combustion engine of multipoint ignition type as in Embodiment 3, the sum of ionic current detection signals detected in the first ignition coil is taken, while the sum of ionic current detection signals detected in the second ignition coil is taken, and the sums are respectively inputted to the ECU 100, whereby the same advantage can be attained.

By the way, in each of Embodiments 1-4, the ionic current has been detected in such a way that the bias circuit 8 of the ionic current detection device 7 is arranged within the ignition coil device 1, and that a bias voltage is fed from the ignition coil 2 to the ignition plug 6 being an ignition source. However, the preignition can be detected even at the appearance of the leak current by the same processing, by detecting an ionic current in any of a case where a bias voltage source is prepared as an independent power source module and where a bias voltage is fed from the module to the ignition plug 6 being the ignition source, a case where a bias voltage source is prepared as an independent power source module and where a bias voltage is fed from the module to independent electrodes which are disposed within the combustion chamber as a probe for detecting the ionic current, and a case where the bias circuit 8 is arranged within the ignition coil device 1 and where a bias voltage is fed from the ignition coil 2 to independent electrodes which are disposed within the combustion chamber as a probe for detecting the ionic current.

Besides, in the case where the bias voltage source is prepared as the independent power source module and where the bias voltage is fed from the module to the independent electrodes disposed within the combustion chamber as the ionic current detecting probe, thereby to detect the ionic current, a detection interval for detecting the preignition need not be limited to the conduction interval of the ignition coil, but an interval of, for example, from the 90CA of BTDC (crank angle position of 90 degrees before a top dead center) to the end of a combustion stroke or to the opening of an exhaust valve may well be set as the preignition detection interval, whereby the preignition or the premonitory phenomenon thereof can be detected more precisely.

Further, in each of Embodiments 1-4, the preignition detection device 10 has been disposed within the ECU 100. However, calculations may well be executed by a separate MPU-packaged module, digital signal processor, or logic IC based on a gate array circuit, the output of which is inputted to the ECU 100.

Various modifications and alterations of this invention will be apparent to those skilled in the art without departing from the scope and spirit of this invention, and it should be understood that this invention is not limited to the illustrative embodiments set forth herein.

What is claimed is:

1. A combustion state detection apparatus for an internal combustion engine, comprising:

electrodes which are disposed within a combustion chamber of the internal combustion engine;

voltage application means for applying a voltage across said electrodes in order to detect an ionic current which appears in a case where a mixture combusts within the combustion chamber;

ionic current detection means for detecting the ionic current which appears across said electrodes at the application of the voltage;

data extraction means including detection interval setting means for setting a detection interval for detecting preignition or a premonitory phenomenon thereof from the detected ionic current, said data extraction means serving to extract ionic current data correspondent to a change of the ionic current in the detection interval;

convexity detection means for detecting that domain within the detection interval in which a change shape of the ionic current is upwardly convex, on the basis of the extracted ionic current data; and preignition decision means for finding an appearance position and a peak position of the ionic current by comparing the ionic current in the upwardly convex domain detected by said convexity detection means with a predetermined threshold value, and then deciding occurrence of the preignition or the premonitory phenomenon thereof on the basis of the appearance position and the peak position of the ionic current obtained;

wherein said convexity detection means includes leak current judgment means for judging existence or nonexistence of appearance of a leak current across said electrodes, and it enables the detection of the upwardly convex domain in a case where the appearance of the leak current has been judged.

2. A combustion state detection apparatus for an internal combustion engine as defined in claim 1, wherein said convexity detection means includes start point setting means for specifying a start point of a threshold value for the convexity detection, and bottom threshold value means for setting a bottom threshold value along a bottom of the change shape of the ionic current from the start point, whereby a domain in which the ionic current data exceeds the bottom threshold value is determined as the upwardly convex domain.

3. A combustion state detection apparatus for an internal combustion engine as defined in claim 2, wherein said start point setting means sets the start point at an end position of a mask interval set by mask setting means.

4. A combustion state detection apparatus for an internal combustion engine as defined in claim 1, wherein said convexity detection means includes quadratic- fluctuation-quantity calculation means for calculating a quadratic fluctuation quantity which contains a linear derivative or a quadratic derivative of the ionic current within the detection interval, whereby a domain in which a value of the quadratic fluctuation quantity becomes equal to or less than a predetermined level is determined as the upwardly convex domain.

5. A combustion state detection apparatus for an internal combustion engine as defined in claim 1, wherein said preignition decision means determines a position at which an integral value of the domain where the change shape of the ionic current is upwardly convex exceeds a predetermined level, as the appearance position of the ionic current.

6. A combustion state detection apparatus for an internal combustion engine as defined in claim 1, wherein said preignition decision means determines a start point of the domain where the change shape of the ionic current is upwardly convex, as the appearance position of the ionic current.

7. A combustion state detection apparatus for an internal combustion engine as defined in claim 1, wherein said detection interval setting means sets any desired interval from a crank angle position of 90 degrees before a top dead center, to an end of a combustion stroke, as the detection interval.

8. A combustion state detection apparatus for an internal combustion engine as defined in claim 1, wherein said electrodes constitute an ignition plug which strikes a spark within the combustion chamber in order to cause the combustion in the internal combustion engine, and said voltage application means applies a voltage for detecting the ionic current, to said electrodes of said ignition plug through an ignition coil which generates a high voltage for causing said ignition plug to spark.

9. A combustion state detection apparatus for an internal combustion engine as defined in claim 8, wherein said detection interval setting means sets an interval from a rise to a fall of an ignition signal applied to the ignition coil, as the detection interval.

10. A combustion state detection apparatus for an internal combustion engine as defined in claim 8, wherein said detection interval setting means includes mask setting means for setting a predetermined mask interval from a timing of start of conduction to a primary winding of said ignition coil, whereby the ionic current detected within the mask interval set by said mask setting means is not handled as a signal for detecting the preignition or the premonitory phenomenon thereof.

11. A combustion state detection apparatus for an internal combustion engine as defined in claim 1, wherein the predetermined threshold value is acquired from a map based on running conditions.

12. A combustion state detection apparatus for an internal combustion engine as defined in claim 1, wherein said ionic current detection means detects a sum of a plurality of ionic currents which are obtained from a plurality of combustion chambers or an identical combustion chamber.

13. A combustion state detection method for an internal combustion engine, comprising:

a first step of setting a detection interval for detecting preignition or a premonitory phenomenon thereof from an ionic current which appears across electrodes disposed within a combustion chamber of the internal combustion engine, in a case where a mixture combusts within the combustion chamber, and then extracting ionic current data correspondent to a change of the ionic current in the detection interval;

a second step of detecting that domain within the detection interval in which a change shape of the ionic current is upwardly convex, on the basis of the extracted ionic current data; and a third step of finding an appearance position and a peak position of the ionic current by comparing the ionic current in the upwardly convex domain with a predetermined threshold value, and then deciding occurrence of the preignition or the premonitory phenomenon thereof on the basis of the appearance position and the peak position of the ionic current obtained;

wherein said second step includes a step of judging existence or nonexistence of appearance of a leak current across the electrodes, and it enables the detection of the upwardly convex domain in a case where the appearance of the leak current has been judged.

* * * * *